United States Patent [19]

Sakai et al.

[11] Patent Number: 4,751,854
[45] Date of Patent: Jun. 21, 1988

[54] ASSEMBLY FOR CONSTITUTING A STEPLESS SPEED CHANGE GEAR OF FRICTION-DRIVE TYPE

[75] Inventors: Jiro Sakai, Nara; Yoshihisa Iida, Joyo; Kikuo Okamura, Kyoto, all of Japan

[73] Assignee: Shinpo Kogyo Kabushiki Kaisha, Japan

[21] Appl. No.: 886,910

[22] Filed: Jul. 18, 1986

[30] Foreign Application Priority Data

Jul. 19, 1985 [JP] Japan ........................... 60-0159930
Mar. 17, 1986 [JP] Japan ............................... 61-59052

[51] Int. Cl.$^4$ .................... F16H 15/16; F16H 15/52
[52] U.S. Cl. .................................. 74/796; 74/191
[58] Field of Search .......................... 74/796, 191, 798

[56] References Cited

U.S. PATENT DOCUMENTS

| | | | |
|---|---|---|---|
| 2,886,986 | 5/1959 | Kopp | 74/796 |
| 3,108,496 | 10/1963 | Kashihara | 74/796 |
| 3,108,497 | 10/1963 | Kashihara | 74/796 |
| 3,127,793 | 4/1964 | Kashihara | 74/796 |
| 3,525,274 | 8/1970 | Kubota | 74/796 |
| 3,822,610 | 7/1974 | Erban | 74/796 X |
| 4,232,561 | 11/1980 | Kashihara et al. | 74/796 X |
| 4,653,349 | 3/1987 | Kaneyuki | 74/796 |

FOREIGN PATENT DOCUMENTS

| | | | |
|---|---|---|---|
| 0087547 | 9/1983 | European Pat. Off. | 74/796 |
| 2825730 | 9/1978 | Fed. Rep. of Germany . | |
| 1120097 | 2/1982 | Japan . | |
| 0137657 | 8/1983 | Japan | 74/796 |
| 0163854 | 9/1983 | Japan | 74/796 |
| 0164057 | 8/1985 | Japan | 74/191 |
| 0196458 | 10/1985 | Japan | 74/796 |

Primary Examiner—Allan D. Herrmann
Attorney, Agent, or Firm—Burns, Doane, Swecker & Mathis

[57] ABSTRACT

A type of a stepless speed change gear has a plurality of conical rollers each of which has a conical surface frictionally and internally engaging a ring-member moved axially by a speed changing device, a first annular surface frictionally engaging a disc of small diameter on an input shaft and a second annular surface frictionally engaging with a disc or large diameter arranged coaxially with the input shaft, and a contact pressure generating device of cam-type for generating contact pressures at three frictionally engaging points on each of the conical rollers. An assembly in which thrusting due to the friction-drive does not act onto the casing is provided. In the assembly, the disc of small diameter, the disc of large diameter and the contact pressure generating device are supported by a single shaft prohibiting running-out of them in axial direction. In addition, the conical rollers are bundled by the ring-member so that they will not drop out of the assembly.

5 Claims, 3 Drawing Sheets

ASSEMBLY FOR CONSTITUTING A STEPLESS SPEED CHANGE GEAR OF FRICTION-DRIVE TYPE

PRIOR ART

Stepless speed change gears of friction-drive type are disclosed in Japanese Pat. No. 1,120,097 (Japanese patent application bulletin No. 1,3221/1982), U.S. Pat. No. 4,232,561 and West German Pat. No. 2,825,730. These speed change gears include a plurality of conical rollers each of which has a conical surface frictionally and internally engaging a ring-member moved axially by a speed-changing means, a first annular surface frictionally engaging a disc of small diameter on an input shaft and a second annular surface frictionally engaging a disc of large diameter arranged coaxially with the input shaft, and a contact pressure generating device of cam-type for generating contact pressures at three frictionally engaging points on each of the conical rollers; one of the ring-member and the disc of large diameter is constrained in its rotation so that the rotation of the other is transmitted to an output shaft.

Hereafter, to simplify expressions, the above type of speed change gear will be called "R-type speed change gear".

The speed varying range of the R-type speed change gear includes a point on which the speed of the output shaft is zero. Further, the R-type speed change gear can generate a large torque which increases following the decrease of speed of the output shaft.

Due to these preferable features, the R-type stepless speed change gear can be used in various ways, and it is particularly suitable for a device that manipulates heavy articles and for a power transmitting device in which a large variation of torque occurs.

The R-type speed change gears can be provided as one part of a power transmitting device in various machines. And, in this case, as the casing of the machine is utilized for the provision of the R-type speed change gear, the casing of the machine must be reinforced so as to bear against a very large thrusting force caused by friction-drive in the speed change gear.

OBJECTS AND SUMMARY OF THE INVENTION

One objects of the present invention is to provide an assembly for constituting an R-type speed change gear which can be used in various machines without requiring any reinforcement of their casings.

Another object of the present invention is to provide an assembly which permits a rational production of the R-type speed change gear.

According to the present invention, an assembly for constituting a stepless speed change gear of friction-drive type having a plurality of conical rollers each of which has a conical surface frictionally and internally engaging a ring-member moved axially by a speed changing means, a first annular surface frictionally engaging with a disc of small diameter on an input shaft and a second annular surface frictionally engaging with a disc of large diameter arranged coaxially with the input shaft and a contact pressure generating device of cam-type for generating contact pressures at three frictionally engaging points on the conical roller; one of the ring-member and the disc of large diameter is constrained its rotation so that the rotation of the other is transmitted to an output shaft. The disc of small diameter, the disc of large diameter and the camp-type contact pressure generating device are supported by a single shaft prohibiting their running-out in an axial direction. In addition, the conical rollers, the disc of small diameter, the disc of large diameter, the contact pressure generating device of cam-type and the single shaft are bundled by the ring-member.

In the case of R-type speed change gear constituted by using the above assembly, thrusting force caused by the friction-drive does not act on the casing of the speed change gear, because it is an internal force in the assembly. The assembly can be prepared for the manufacturing of speed change gear of common use together with the manufacturing of speed change gear which will be provided in other machines.

BRIEF DESCRIPTION OF THE DRAWINGS

The present invention will be explained hereafter referring to the drawings wherein like reference numerals are applied to like elements and in which.

DESCRIPTION OF THE PREFERRED EMBODIMENTS

Figure 1:
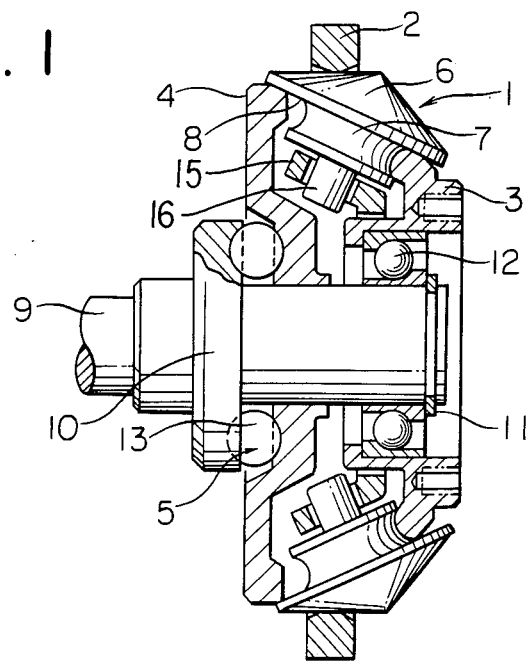
FIG. 1 is a longitudinally sectioned view of an assembly according to the present invention.

Among of these figures, FIG. 1 shows an embodiment wherein a disc of small diameter, a disc of large diameter and a pressure generating device of cam-type are supported by an output shaft.

In FIG. 1, there are conical rollers 1, a ring-member for changing speed 2, a disc of small diameter 3, a disc of large diameter 4 and a contact pressure generating device of cam-type 5. Each of the conical rollers 1 is provided with (a) a conical surface 6 frictionally engaging with the ring-member 2, (b) a power transmitting surface 7 of concave cross section frictionally engaging the disc 3 of small diameter, and (c) a flat or nearly flat surface 8 frictionally engaging with the disc 4 of large diameter. Each conical roller 1 is carried by a corresponding shaft 16 which is supported in an annular carrier 15. The disc 3 of small diameter is an element for introducing power, and it will be connected to an input shaft not shown.

An output shaft 9 is provided, and this output shaft 9 supports the disc 3 of small diameter, the disc 4 of large diameter and a contact pressure generating device 5, prohibiting running-out of them in axial direction. The prohibition above or running-out is carried out by means of a collar 10 axially fixed to the output shaft 9 as a part of the contact pressure generating device 5 and a snap-ring 11 or the like engaging the output shaft.

A thrust bearing 12 of angular contact type is provided between the disc 3 of small diameter and the output shaft 9. Balls 13 or rollers are interposed between the opposing cam-surface of the contact pressure generating device 5, respectively.

The ring-member 2 prohibits dropping-out of the conical rollers 1 in the radial direction, and the output shaft 9 prohibits running-out of the disc 3 of small diameter, the disc 4 of large diameter and the contact pressure generating device 5 in axial direction.

Thus, the assembly is arranged as one in which the output shaft 9 is used as a supporting member and as one in which the ring-member 2 is used as a bundling member.

In the case of a stepless speed change gear constituted by using the above assembly, thrusting force caused by friction-drive acts as an internal force in the assembly.

Figure 2:
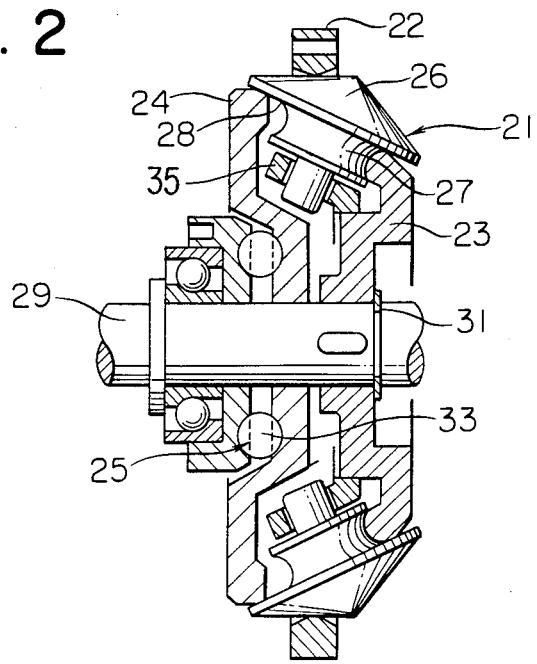
FIG. 2 is a longitudinally sectioned view of another assembly according to the present invention.

FIG. 2 shows an embodiment of the present invention in which a disc 23 of small diameter, a disc 24 of large diameter and a contact pressure generating device 25 are supported by an input shaft 29. In the case of the assembly shown in FIG. 1, the output shaft 9 is an element provided in the assembly and the disc 3 of small diameter is an element which will be connected to an input shaft provided outside of the assembly. On the other hand, in the case of assembly shown in FIG. 2, the input shaft 29 is an element provided in the assembly and the disc 24 of large diameter is an element which will be operatively connected to an output shaft not shown through the contact pressure generating device 25.

Each conical roller 26 is supported in an annular carrier 35.

As the assemblies shown in FIG. 1, and FIG. 2 are similar cones, except the above mentioned point, numerals in FIG. 2 have "20" added to corresponding numerals in FIG. 1 for the designation of the corresponding parts. In the case of assembly shown in FIG. 2, the input shaft 29 is a supporting member corresponding to the output shaft 9 in FIG. 1, and the ring-member 22 is a bundling member corresponding to the ring-member 2 in FIG. 1.

Figure 3:
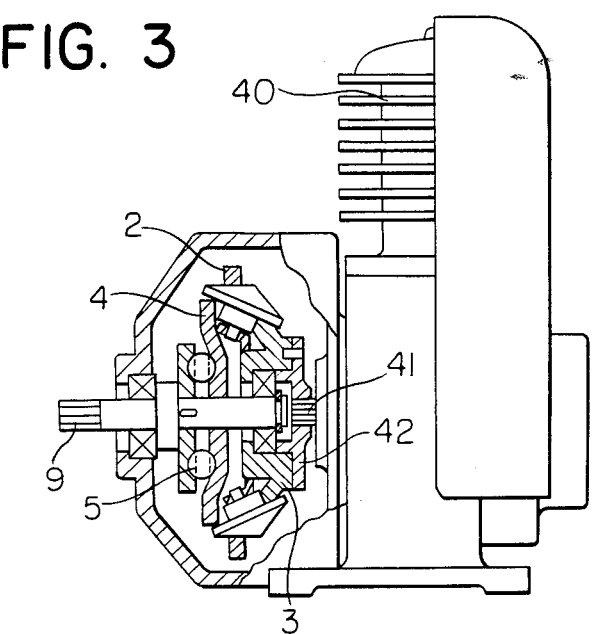
FIG. 3 and FIG. 4 are longitudinally sectioned views showing examples provided with the assembly of FIG. 1 and Fig. 2, respectively.
Figure 4:
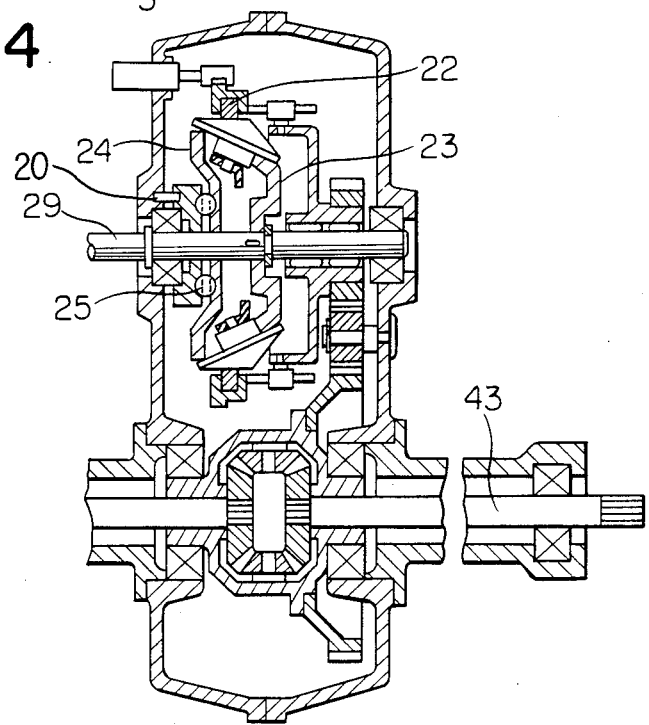

FIG. 3 and FIG. 4 show examples of R-type speed change gear constituted by using the assembly shown in FIG. 1 and FIG. 2 respectively.

The speed change gear shown in FIG. 3 is a "non-rotary ring type" wherein rotation of the ring-member 2 is constrained by the speed changing means not shown and rotation of the disc 4 of large diameter is transmitted to the output shaft through the contact pressure generating device 5. On the other hand, the speed change gear shown in FIG. 4 is a "rotary-ring type" wherein rotation of the disc 24 is constrained by the contact pressure generating device 25 and rotation of the ring-member 22 is transmitted to axles 43 by mean of gear trains. It will be noticed that the contact pressure generating device 24 is constrained in its rotation by a pin 20 interposed between the casing of the speed change gear and the device.

In FIG. 3 there is shown an engine 40, and an output shaft 41 of the engine which is connected to the disc 3 of small diameter. For this connection, a member 42 is attached to the disc 3 of small diameter.

Figure 5:
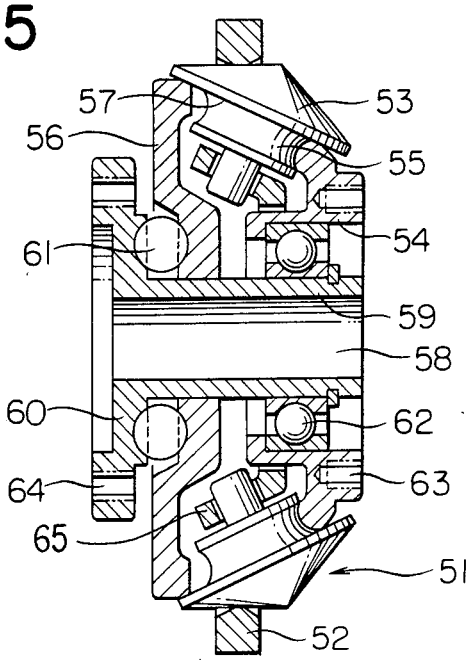
FIG. 5 is a longitudinally sectioned view of yet another assembly according to the present invention.

FIG. 5 shows another assembly according to the present invention. There are shown conical rollers 51, a ring member 52, conical surfraces 53, a disc 54 of small diameter, power transmitting surface 55 of concave cross-section, a disc 56 of large diameter, flat power transmitting surfaces 57, a supporting member 59 provided with an axial hole 58 extending from one end to the other end, a flange portion 60, a contact pressure generating device 61, a thrust bearing 62 of angular contact type, and threaded holes 63.

As with the embodiments discussed above, each conical roller 51 is supported in an annular carrier 65.

Figure 6:
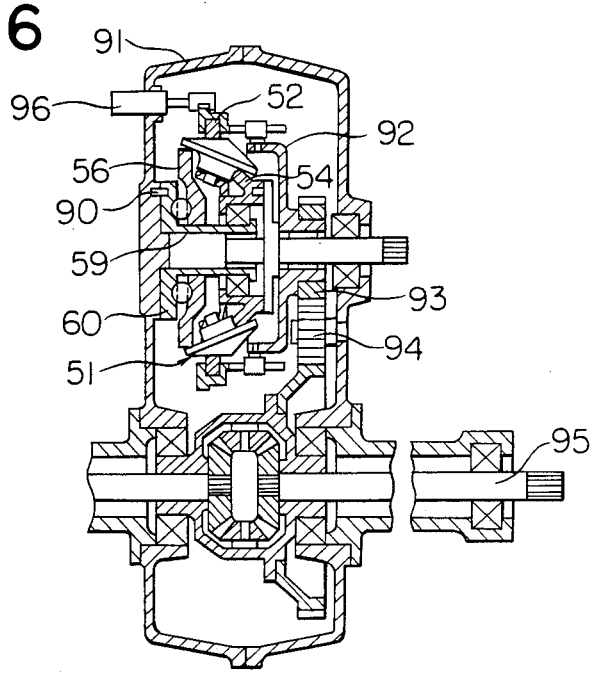
FIG. 6 is a longitudinally sectioned view showing an example provided with the assembly shown in FIG. 5.

The above mentioned axial hole 58 can be utilized in various ways when the assembly is used to constitute the Rtype speed change gear within a casing of another machine. FIG. 6 shows an example wherein the assembly of FIG. 5 is provided within a casing of a power transmitting device of a vehicle. And the following elements are shown: a pin 90 for constraining the rotation of the disc 56 of large diameter, a casing 91 of power transmitting device, a rotating member 92 rotatively connected to the ring-member 52, a gear 93 keyed to the rotating member 92, an idle-gear 94 meshing with the gear 93, axles 95 rotated by the gear 93 through a differential gear mechanism and a speed changing means 96 for moving the ring-member 52 in an axial direction, together with elements shown in FIG. 5.

In operation of the embodiment of FIG. 1, the small diameter disc 3 is driven as the input member. Rotation of the small disc 3 is frictionally transmitted to the underside of the conical roller 1. The ring member 2 is rotationally fixed so that as the conical rollers rotate about their respective shafts 16, frictional engagement of the conical surface 6 with the fixed ring 2 causes the annular carrier 15 to rotate about the axis of the output shaft 9. Frictional engagement of the large diameter disc 4 with the perimeter of the underside of the conical roller imparts a rotational speed to the output shaft 9. The dynamics of the speed relationships are varied by changing the axial position of the ring member 2.

It will now be apparent that an improved stepless speed change gear of the friction-drive type has been disclosed. Moreover, it will be apparent to those skilled in the art that numerous modifications, variations, substitutions and equivalents exist for the features of the invention. Accordingly, it is expressly intended that all modifications variations, substitutions, and equivalents which fall within the spirit and scope of the invention as defined by the appended claims be embraced thereby.

What is claimed is:

1. An assembly for a stepless speed change gear of the friction-drive type comprising:
   a shaft;
   a small diameter disc on the shaft;
   a large diameter disc arranged coaxially on the shaft;
   an axially movable ring member;
   one of the ring member and the large diameter disc being constrained against rotation so that rotation of the other is transmitted as output rotation;
   speed-changing means for axially moving the ring member;
   an annular carrier disposed around the shaft and positioned between the small diameter disc and the large diameter disc;
   a plurality of conical rollers, each of which is mounted on the annular carrier and each of which has:
   a conical surface frictionally and internally engaging the ring member,
   a first annular power transmitting surface frictionally engaging the small diameter disc, and
   a second power transmitting surface frictionally engaging the large diameter disc;
   a contact pressure generating means of the cam-type for generating contact pressures at three frictional engagement points on each conical roller comprising:
   the shaft,
   a collar provided on the shaft, and
   a snap ring engaging the shaft;

the small diameter disc, the large diameter disc and the contact pressure generating means being supported between the collar and the snp-ring by the single shaft so as to prohibit axial runout between the small diameter disc, the large diameter disc and the contact pressure generating means along the shaft; and the small diameter disc, the large diameter disc, the contact pressure generating means and the shaft being radially constrained by the ring member.

2. The assembly for a stepless speed change gear of the friction drive type according to claim 1 further including an axial bore extending from one end to the other end of the shaft.

3. The assembly for a stepless speed change gear of the friction drive type according to claim 1 wherein the conical surface of each conical roller has an obtuse cone angle.

4. The assembly for a stepless speed change gear of the friction drive type according to claim 1 wherein the ring member has a position where the output rotation is zero.

5. An assembly for a stepless speed change gear of the friction-drive type comprising:
- a shaft;
- a small diameter disc on the shaft;
- an axially movable ring member;
- on of the ring member and the large diameter disc being constrained against rotation so that rotation of the other is transmitted as output rotation;
- speed-changing means for axially moving the ring member;
- an annular carrier disposed around the shaft and positioned between the small diameter disc and the large diameter disc;
- a plurality of conical rollers, each of which is mounted on the annular carrier and each of which has:
  - a conical surface frictionally and internally engaging the ring member,
  - a first annular power transmitting surface frictionally engaging the small diameter disc, and
  - a second annular power transmitting surface frictionally engaging the large diameter disc;
- a contact pressure generating means of the cam type for generating contact pressures at three frictional engagement points on each conical roller comprising:
  - the shaft,
  - a collar provide on the shaft, and
  - a pair of snap rings engaging the shaft;
- the small diameter disc, the large diameter disc and the contact pressure generating means are supported between above mentioned snap rings by the shaft prohibiting axial runout of them from the shaft;
- the small diameter disc, the large diameter disc, the contact pressure generating means and the shaft being radially constrained by the ring member.

* * * * *